United States Patent [19]
Ashikawa et al.

[11] Patent Number: 5,224,393
[45] Date of Patent: Jul. 6, 1993

[54] ELECTRONICALLY CONTROLLED TRANSMISSION AND STEERING WHEEL LOCATED SHIFT MECHANISM

[75] Inventors: Noboru Ashikawa; Masami Takano; Akihito Ohhashi; Toyoshi Yasuda, all of Saitama, Japan

[73] Assignee: Honda Giken Kogyo Kabushiki Kaisha, Tokyo, Japan

[21] Appl. No.: 696,631

[22] Filed: May 7, 1991

[30] Foreign Application Priority Data

May 11, 1990 [JP] Japan .................. 2-49593[U]
May 11, 1990 [JP] Japan .................. 2-121998

[51] Int. Cl.⁵ .............................................. F16H 63/00
[52] U.S. Cl. .......................... 74/337.5; 74/336 R
[58] Field of Search ............... 74/336 R, 337.5, 339, 74/866

[56] References Cited

U.S. PATENT DOCUMENTS

| | | | |
|---|---|---|---|
| 2,051,386 | 8/1936 | Murray | 192/44 |
| 4,409,858 | 10/1983 | Lasoen | 74/337.5 |
| 4,455,884 | 6/1984 | Tsuruta et al. | 74/337.5 X |
| 4,574,652 | 3/1986 | Schichinohe et al. | 74/337.5 X |
| 4,649,768 | 3/1987 | Kusaka et al. | 74/484 R |
| 4,664,217 | 5/1987 | Welch et al. | 74/337.5 X |
| 4,713,979 | 12/1987 | Muto et al. | 74/337.5 |
| 4,817,451 | 4/1989 | Weismann | 192/47 X |
| 4,846,010 | 7/1989 | Fujikawa et al. | 74/337.5 |
| 4,860,607 | 8/1989 | Numazawa et al. | 74/336 R |

FOREIGN PATENT DOCUMENTS

| | | |
|---|---|---|
| 108209 | 8/1983 | European Pat. Off. . |
| 0389703 | 10/1990 | European Pat. Off. . |
| 890021 | 8/1953 | Fed. Rep. of Germany ..... 74/337.5 |
| 794846 | 2/1936 | France ............... 74/337.5 |
| 1262731 | 4/1961 | France . |
| 2578206 | 2/1986 | France . |
| 58-121339 | 7/1983 | Japan ..................... 74/337.5 |
| 62-177339 | 8/1987 | Japan ..................... 74/337.5 |
| 63-53342 | 3/1988 | Japan ..................... 74/337.5 |
| 301314 | 8/1954 | Switzerland ............. 74/337.5 |
| 18872 | of 1900 | United Kingdom .......... 74/337.5 |

*Primary Examiner*—Rodney H. Bonck
*Assistant Examiner*—Ryan W. Massey
*Attorney, Agent, or Firm*—Lyon & Lyon

[57] ABSTRACT

An electronically controlled transmission in which a shift actuator for driving a sleeve of a roller synchro mechanism and a throttle actuator for an engine are electronically controlled. The shift actuator is comprised of a drum type actuator of a simple structure comprising a shift drum and a shift fork. The use of the roller synchro mechanism ensures that only a small driving force for the shift drum is required, which makes it possible to provide a reduction in size of the shift actuator. In addition, a shift lever for operating a shift switch for producing the shifting instruction signal is mounted on either left or right side of the steering wheel. This ensures that the shifting-up and shifting-down signals can be produced by one of the driver's hands, leading to an improvement in operability of the shift lever.

4 Claims, 19 Drawing Sheets

ELECTRONICALLY CONTROLLED TRANSMISSION AND STEERING WHEEL LOCATED SHIFT MECHANISM

BACKGROUND OF THE INVENTION

1. Field of the Invention

The field of the present invention is electronically controlled transmissions in which a roller synchro mechanism provided in the transmission is operated by a shift actuator that is electronically controlled, and steering wheel mechanisms located which deliver shifting instruction signals to the electronically controlled transmission.

2. Description of the Prior Art

There is a conventionally known electronically controlled transmission described in U.S. Pat. No. 4,817,451. Such electronically controlled transmission comprises a so-called roller synchro mechanism designed to establish a desired gear-shift stage by bringing one of a plurality of gears relatively rotatably carried on a rotary shaft into engagement with the rotary shaft through rollers. While a throttle actuator is driven to control the rotational speed of an engine on the basis of an engine rotational speed signal, transmission input and output shaft rotational speed signals and electric gear-shifting instruction signals received into an electronic control unit, the roller synchro mechanism is operated by a shift actuator, thus establishing a desired gear-shift stage.

SUMMARY OF THE INVENTION

The above roller synchro mechanism has an excellent advantage that in moving a shifting sleeve to establish a desired gear-shift stage, only an extremely small driving force for the sleeve is required. Accordingly, it is a first object of the present invention to provide reductions in size and weight of the electronically controlled transmission comprising such a roller synchro mechanism in view of the above advantage.

It is a second object of the present invention to provide a steering wheel located shift mechanism capable of reliably producing a shifting instruction signal for operating an electronically controlled transmission of the above-described type by a simple operation.

To achieve the first object, according to the present invention, there is provided an electronically controlled transmission comprising a roller synchro mechanism adapted to establish a desired gear-shift stage by bringing a gear relatively rotatably carried on a rotary shaft into engagement with the rotary shaft through rollers, a shift actuator for operating the roller synchro mechanism, a throttle actuator adapted to control the rotational speed of the engine, and an electronic control unit for controlling the shift actuator and the throttle actuator on the basis of a shifting instruction signal, wherein the shift actuator comprises a shift drum having cam grooves in the outer periphery thereof and connected to and rotatably driven by a motor, and a shift fork axially slidably carried on the shift drum, with one end engaging with the sleeve and the other end provided with a pin engaging with the cam groove.

With the above construction, it is possible to provide a simplified and a compact structure of the shift actuator and the entire transmission by employing the drum-type shift actuator which comprises the shift drum connected to and rotatably driven by the motor, and the shift fork axially slidably carried on the shift drum and including the pin engaging the cam groove provided in the shift drum.

In addition to the above arrangement, if the roller synchro mechanism comprises an annular retainer disposed between the rotary shaft and the gear for relative rotation therewith, and a plurality of rollers radially movably supported in the retainer and opposed to a roller abutment surface formed on one of either the rotary shaft or the gear and to cam grooves formed on the other of the rotary shaft and the gear, and if a dowel of the sleeve which is relatively unrotatably but axially movably carried on the rotary shaft or the gear to be driven by the shift actuator is brought into and out of engagement with the dowel-admission groove, thereby bringing the rotary shaft and the gear into and out of engagement, a gear-shifting can be carried out merely by axially driving the sleeve for overcoming the frictional force, therefore, the driving force required for a gear-shifting operation can be reduced. As a result, the gear-shifting operation can be carried out even by the drum type shift actuator which is generally deemed to exhibit only a small driving force. Thus, reductions in size and weight of the transmission can be realized by a synergistic effect provided by a combination of the roller synchro mechanism with the drum-type shift actuator.

To achieve the second object, according to the present invention, there is provided a steering wheel located shift mechanism for operating a shift switch for producing a shifting-up or shifting-down instruction signal by operation of a shift lever mounted adjacent the steering wheel, wherein the shift lever is mounted on either the left or right side of the steering wheel.

With the above construction, since the shift lever is mounted on either the left or right side of the steering wheel, the shift lever can be operated by either hand resting on the steering wheel, thereby producing the shifting-up and shifting-down instruction signals. This contributes to an improvement in operability of the shift lever.

In addition, to achieve the second object, according to the present invention, there is provided a steering wheel located shift mechanism for operating a shift switch for producing a shifting-up or shifting-down instruction signal by operation of a shift-up lever or a shift-down lever mounted on a steering wheel, wherein the shift-up lever and the shift-down lever are supported for independent movement, and the shift mechanism further includes an interlock mechanism provided between the both levers for restraining the movement of one of the levers during movement of the other lever.

With the above construction, since the shift-up lever for producing the shifting-up instruction signal and the shift-down lever for producing the shifting-down instruction signal are supported for independent movement, the movement of one lever cannot influence the movement of the other lever, leading to an improvement in feeling of operation of the shift lever. Moreover, the provision of the interlock mechanism between the shift-up and shift-down levers ensures that both levers cannot be simultaneously operated, thereby reliably avoiding such a disadvantage that the shifting-up and shifting-down signals are simultaneously produced.

Further, to achieve the second object, according to the present invention, there is provided a steering wheel located shift mechanism for operating a shift switch for producing a shifting-up or shifting-down instruction signal by operation of a shift lever mounted on the steering wheel, wherein the steering wheel and the shift lever are connected to each other through an operatively connecting mechanism which permits them to be rotated together in unison until the steering wheel is rotated through a predetermined angle from a neutral position thereof and which restrains the rotation of the shift lever together with the steering wheel if the angle of rotation of the steering wheel exceeds the predetermined angle.

With the above construction, while the steering wheel is rotated from its neutral position through the predetermined angle, the shift lever is rotated in unison with the steering wheel and therefore, it is possible for a driver to operate the shift lever with both hands on the steering wheel, leading to an improved operability. In addition, if the steering wheel is rotated through an angle exceeding the predetermined angle, such as in sudden cornering or the like, the shift lever is disassociated from the steering wheel and remains at such rotational position which otherwise would result in the positional relationship between the shift-up and shift-down levers being reversed and difficulty in discriminating such positional relationship.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 10 illustrate a first embodiment of the present invention wherein

FIG. 1 is a view illustrating a construction of the entire electronically controlled transmission system;

FIG. 2 is a sectional view illustrating a roller synchro mechanism taken along a line II—II in FIG. 3;

FIG. 3 is a sectional view taken along a line III—III in FIG. 2;

FIG. 4 is a sectional view taken along a line IV—IV in FIG. 2;

FIG. 5 is a perspective view of a retainer;

FIG. 6 is a sectional view of a shift actuator;

FIG. 7 is a development type diagram illustrating the cam grooves in a shift drum;

FIG. 8 is a front view of the steering wheel located shift mechanism;

FIG. 9 is a sectional view taken along a line IX—IX in FIG. 8;

FIG. 10 is a view taken in the direction of an arrow X in FIG. 8;

FIGS. 16 to 18 illustrate a third embodiment of the present invention, wherein

FIG. 16 is a front view of the entire steering wheel located shift mechanism;

FIG. 17 is a sectional view taken along a line XVII—XVII in FIG. 16; and

FIG. 18 is an enlarged sectional view taken along a line XVIII—XVIII in FIG. 17;

FIGS. 19 to 21 illustrate a fourth embodiment of the present invention, wherein

FIG. 19 is a front view of the steering wheel located shift mechanism;

FIG. 20 is a sectional view taken along a line XX—XX in FIG. 19; and

FIG. 21 is a sectional view taken along a line XXI—XXI in FIG. 19;

FIGS. 22 and 23 illustrate a fifth embodiment of the present invention, wherein

FIG. 22 is a front view of the steering wheel located shift mechanism; and

FIG. 23 is a view taken in the direction of an arrow XXIII in FIG. 22

DESCRIPTION OF THE PREFERRED EMBODIMENT

The present invention will now be described by way of several preferred embodiments in connection with the accompanying drawings.

Figure 1:
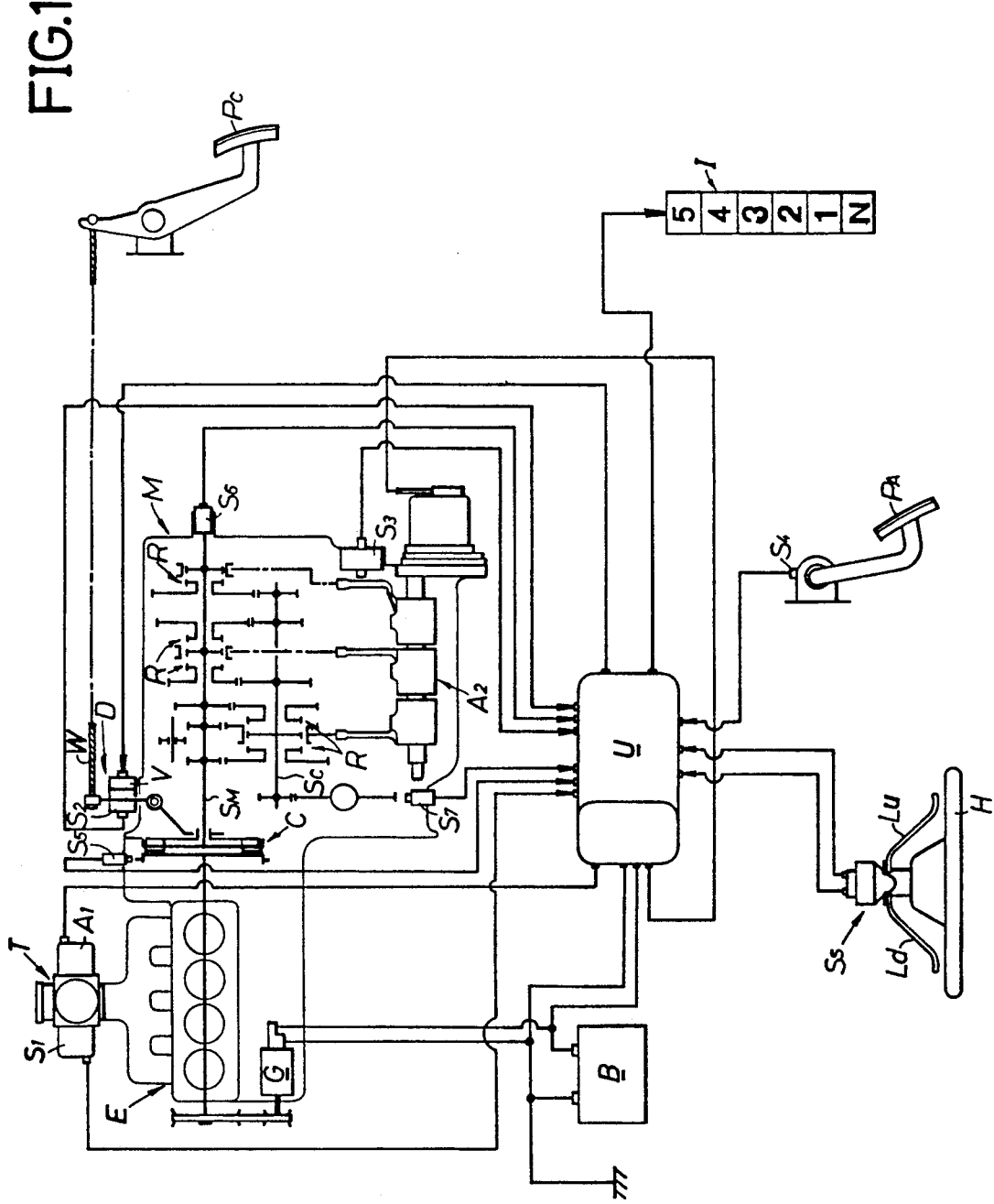

Referring to FIG. 1, an electronically-controlled transmission comprises a multi-stage transmission M and an electronic control unit U which are connected through a clutch C to a rear portion of an in-line four-cylinder engine E. A throttle valve T is provided in the engine E to vary the rotational speed of the engine E, and a throttle actuator $A_1$ for adjusting the opening degree of the throttle valve T and a throttle opening degree sensor $S_1$ for detecting the opening degree are connected to the electronic control unit U. The clutch C is connected to a clutch pedal Pc through a wire cable W, and a solenoid valve V and a clutch stroke sensor $S_2$ provided in a clutch damper D for the clutch C are connected to the electronic control unit U.

A plurality of gear trains are disposed between an input shaft $S_M$ and an output shaft Sc of the multi-stage transmission M to establish a desired gear-shift stage, and each has a roller synchro mechanism R mounted thereon for allowing a gear thereof to be brought into engagement with the input shaft $S_M$ or the output shaft Sc. The roller synchro mechanism R is driven by a drum-type shift actuator $A_2$ connected to the electronic control unit U, and the position of the roller synchro mechanism R is detected by a shift position sensor $S_3$ and indicated on a shift position indicator I.

A steering wheel located shift mechanism Ss is mounted on a steering wheel H and connected to the electronic control unit U. The shift mechanism Ss includes a shift-up lever Lu for producing a shifting-up instruction, and a shift-down lever Ld for producing a shifting-down instruction. Also connected to the electronic control unit U are an accelerator pedal sensor $S_4$ for detecting the position of the accelerator pedal $P_A$, an engine rotational sensor $S_5$ for detecting the rotational speed of a crankshaft of the engine E, an input shaft rotational sensor $S_6$ for detecting the rotational speed of the input shaft $S_M$ of the transmission M, and a vehicle speed sensor $S_7$ for detecting the vehicle speed in association with the rotational speed of the output shaft of the transmission M. The electronic control unit U is connected to and electrically supplied by a battery B charged by a generator G.

The structure of the roller synchro mechanism R that is used for each of the gear trains will be described below in connection with FIGS. 2 to 5.

Figure 2:
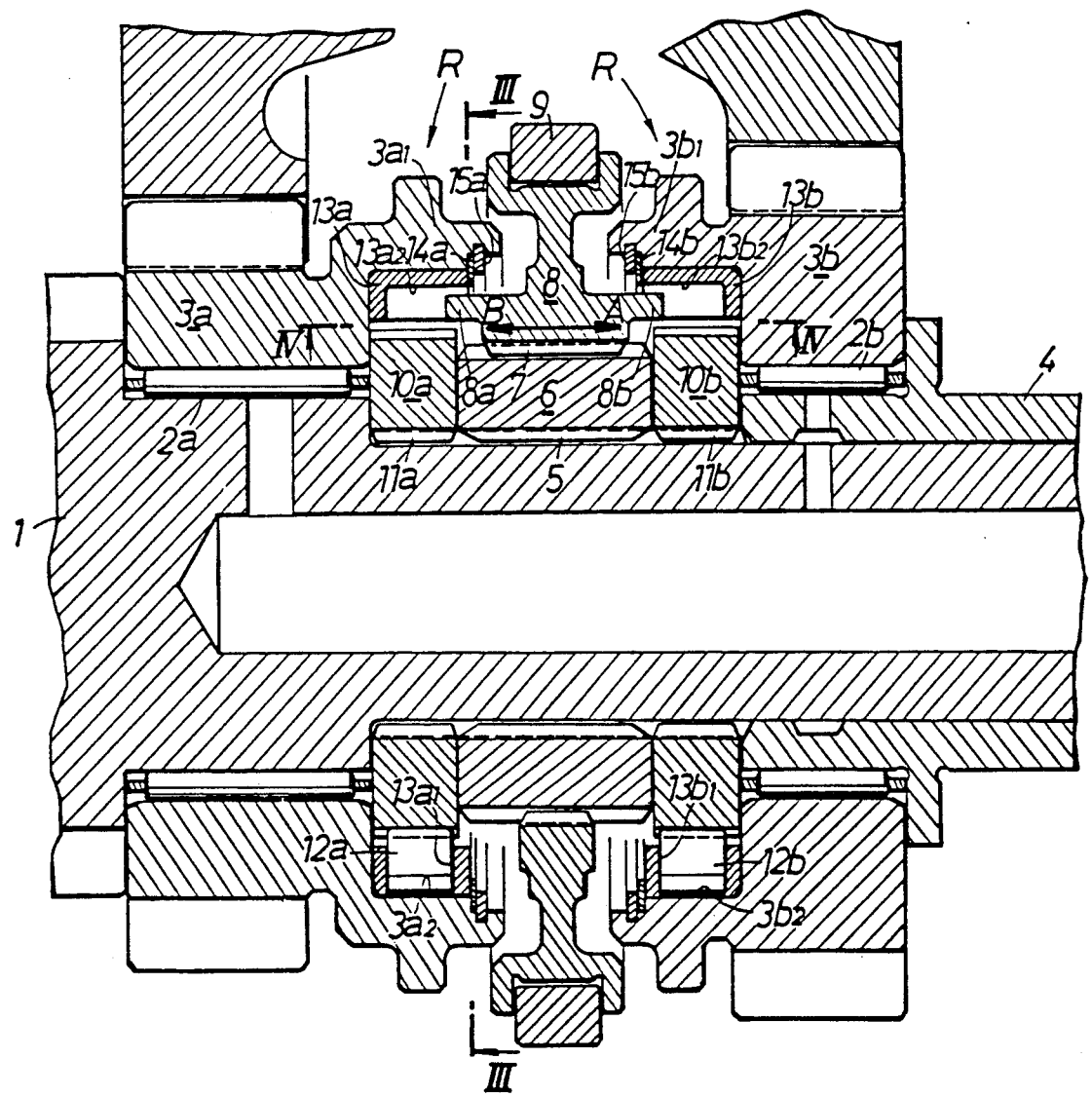

Referring to FIG. 2, a gear $3a$ in an n-th gear shift stage is relatively rotatably carried through a needle bearing $2a$ on a rotary shaft 1 constituting the input shaft $S_M$ or the output shaft Sc of the multi-stage transmission M, and gear $3b$ in an n+1-th gear shift stage is also relatively rotatably carried likewise through a needle bearing $2b$ on a collar 4 fitted over the rotary shaft 1 at a location spaced apart axially from the gear $3a$ by a predetermined distance. A sleeve 8 is axially slidably carried through a spline 7 over an outer periphery of a boss 6 which is coupled to the rotary shaft 1 through a spline 5, so that the axial movement of the sleeve 8 by a leading portion 9 of a shift fork causes the gear $3a$ in the n-th shift stage or the gear $3b$ in the n+1-th shift stage to be brought into integral engagement with the rotary shaft 1, thereby establishing such shift stage.

Figure 3:
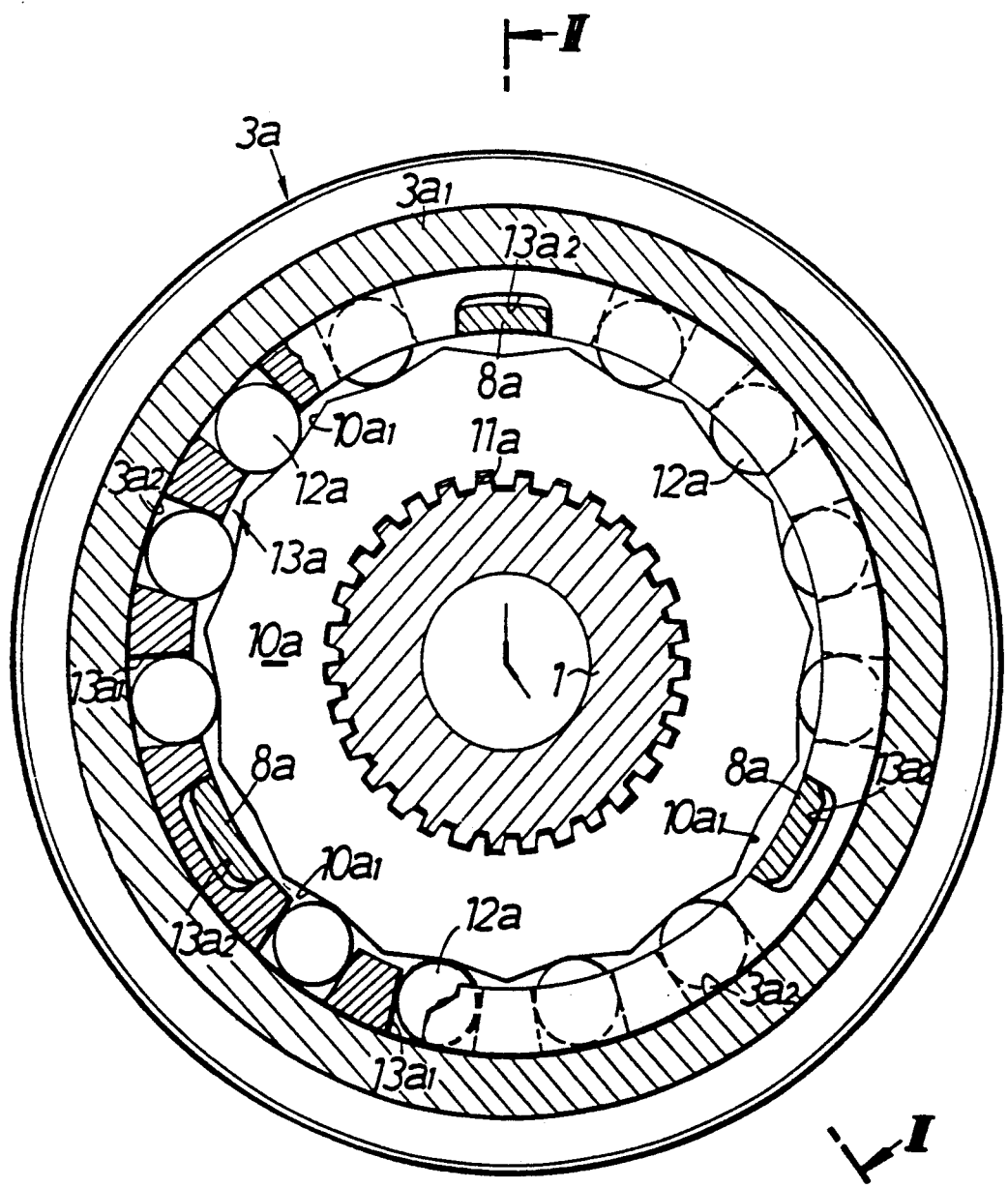

As can be seen from a reference to FIG. 3 together with FIGS. 1 and 2, a ring-shaped inner cam $10a$ is secured through a spline $11a$ to the rotary shaft 1 between the gear $3a$ in the n-th gear shift stage and the boss 6, and has a large number of triangular cam grooves $10a_1$ provided on an outer periphery thereof. A plurality of rollers $12a$ are disposed between the cam grooves $10a_1$ in the inner cam $10a$ and a roller abutment surface $3a_2$ formed around an inner periphery of a projection $3a_1$ provided on one side of the gear $3a$.

Figure 4:
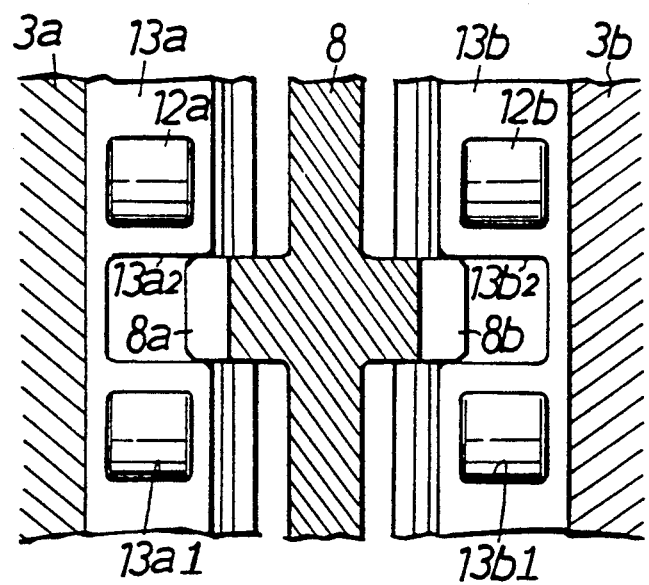
Figure 5:
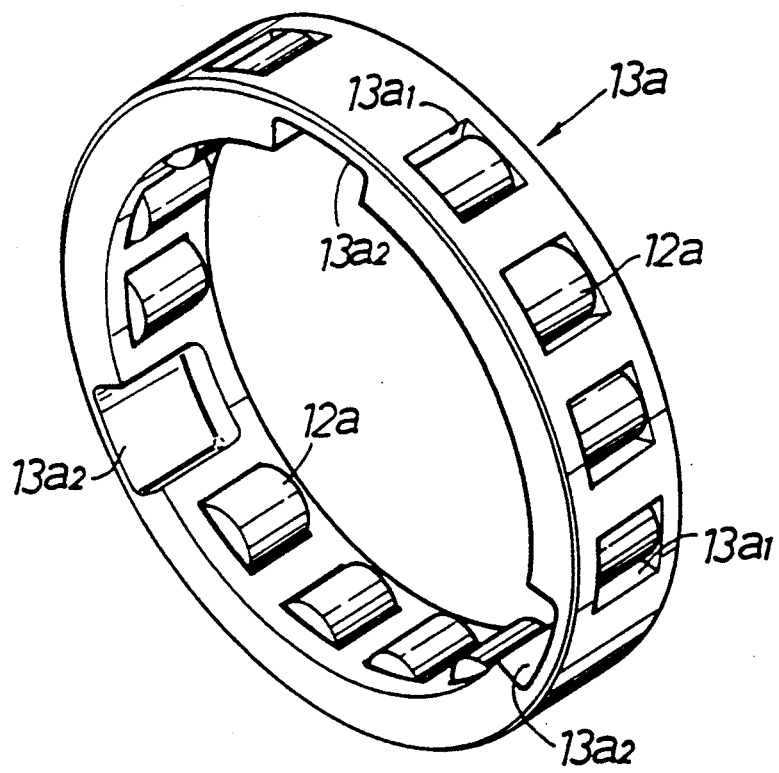

It can be seen from reference to FIGS. 4 and 5 in addition to FIGS. 1 to 3 that a ring-shaped retainer $13a$ is fitted between the inner cam $10a$ and the projection $3a_1$ of the gear $3a$, with an outer periphery thereof placed in sliding contact with the roller abutment surface $3a_2$ of the gear $3a$ for relative rotating movement, and is prevented by a clip $15a$ through a washer $14a$ from slipping out in an axial direction. The retainer $13a$ is provided with a plurality of roller-supporting holes $13a_1$ extending radially therethrough in correspondence to positions of the cam grooves $10a_1$, and the rollers $12a$ are retained within the roller-supporting holes $13a_1$ for slight movement in a radial direction. Three dowel-admission grooves $13a_2$ are provided in an inner periphery of the retainer $13a$ at distances of 120° apart and open into one side surface thereof to extend axially. As best shown in FIG. 4, each of the dowel-admission grooves $13a_2$ is located between a pair of the adjacent roller-supporting holes $13a_1$, thereby ensuring that the axial thickness of the retainer $13a$ is of a minimum level required for retaining the rollers $12a$.

A dowel $8a$ is provided on one side of and projects from the sleeve 8, so that it is removed from the dowel-admission groove $13a_2$ in the retainer $13a$ by the axial movement of the sleeve 8 through the spline 7. When the dowel $8a$ is in engagement in the dowel-admission groove $13a_2$, the inner cam $10a$ and the retainer $13a$ are positioned in their states shown in FIG. 3, and each of the rollers $12a$ is centrally located in the cam groove $10a_1$.

The roller synchro mechanism R for the n+1-th gear shift stage has a structure substantially symmetrical with and identical to the roller synchro mechanism R for the n-th gear shift stage and hence, the duplicated description thereof is omitted by using reference characters with a suffix b attached thereto for referring to the same elements.

The structure of the shift actuator $A_2$ will now be described in connection with FIGS. 6 and 7.

Figure 6:
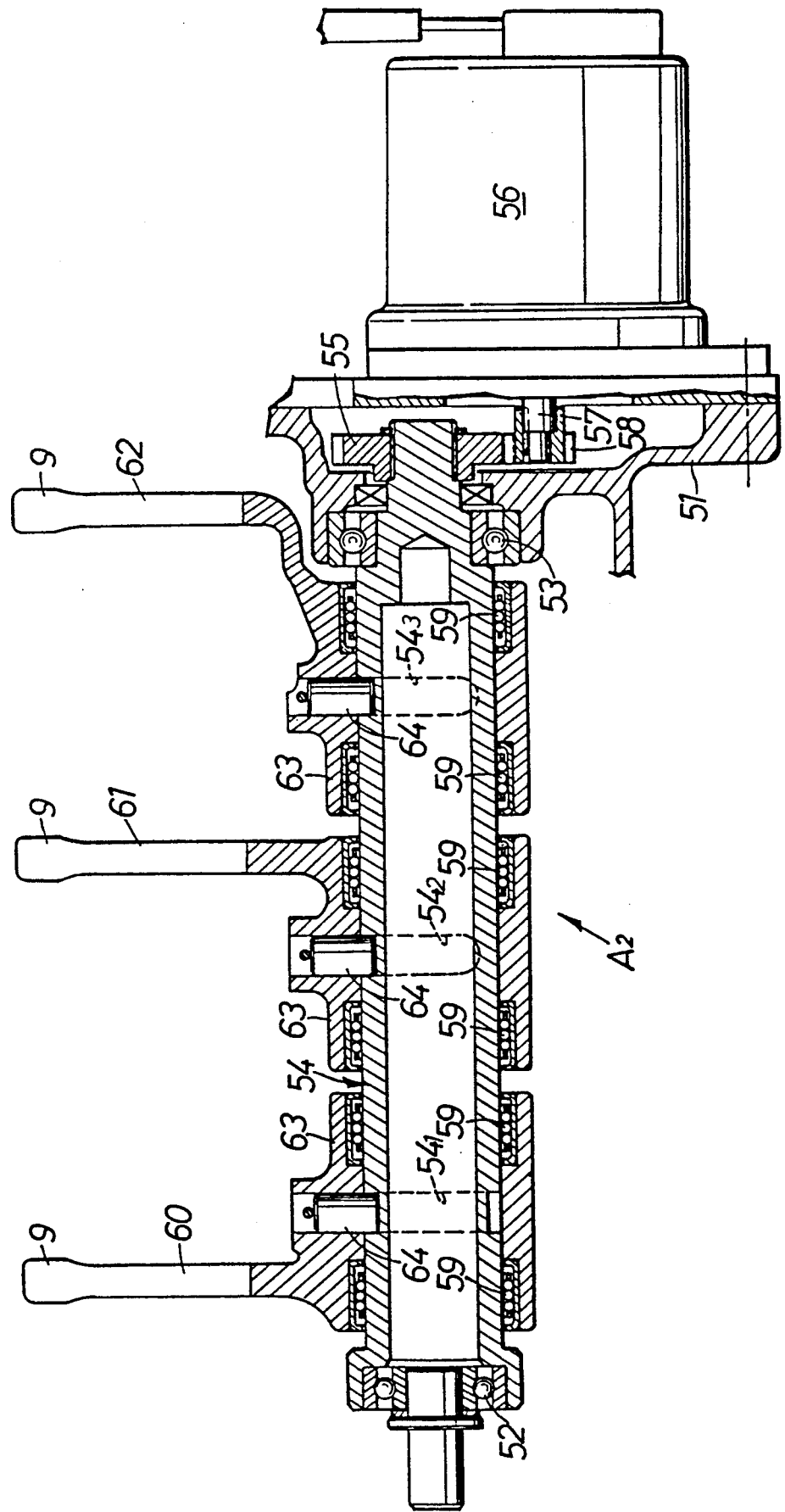
Figure 7:
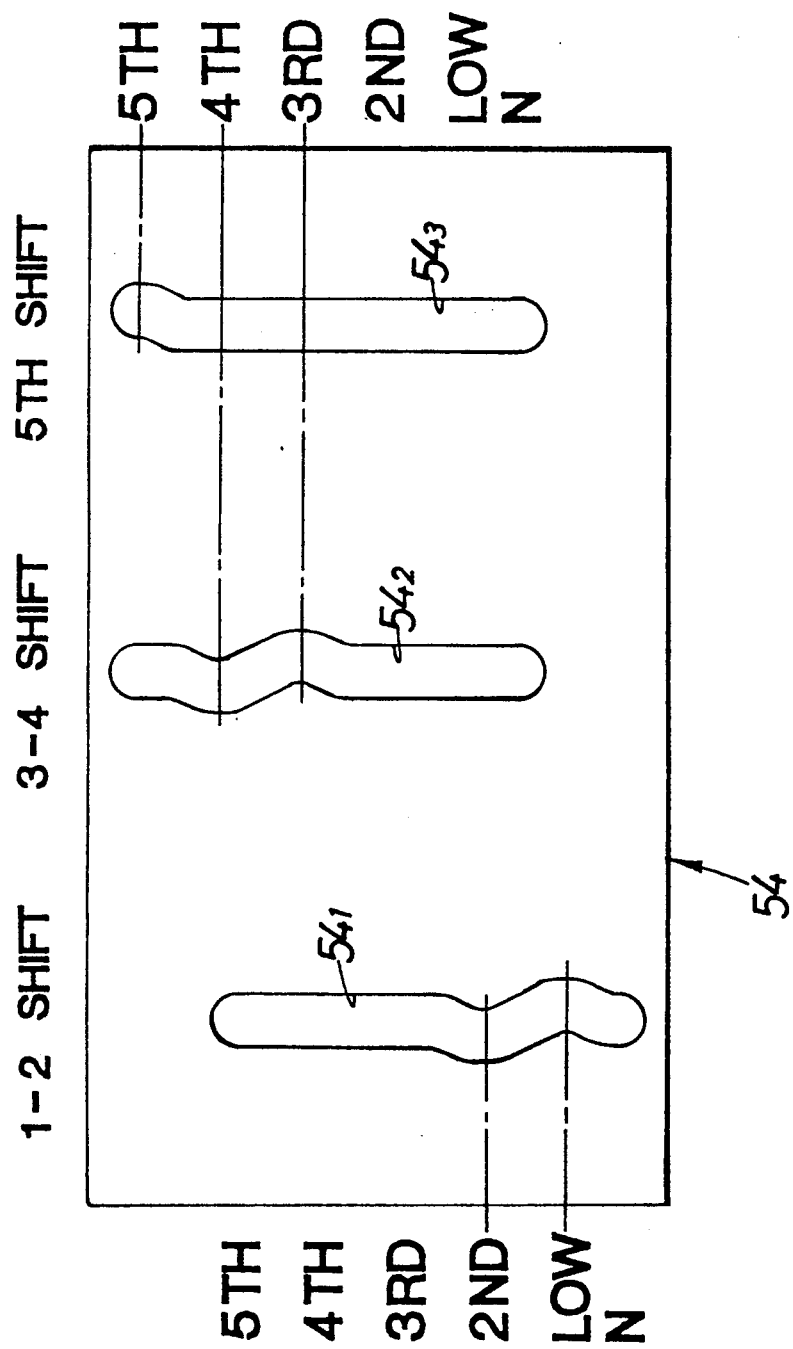

Referring to FIG. 6, a cylindrical shift drum 54 is carried at its opposite ends on a casing 51 for the transmission M through a pair of ball bearings 52 and 53. A drive gear 58 is secured to a drive shaft 57 of a pulse motor 56 attached to the casing 51 and is meshed with a follower gear 55 secured to one end of the shift drum 54. Both drive gear 58 and follower gear 55 are spur gears. Three shift forks 60, 61 and 62 are slidably carried at their base portions 63 over the outer periphery of the shift drum 54, with each supported by a pair of slide bearings 59. As seen from a reference to FIG. 7 in addition to FIG. 6, the shift drum 54 has three cam grooves $54_1$, $54_2$ and $54_3$ provided on the outer periphery thereof corresponding to the shift forks 60, 61 and 62, respectively, and pins 64 embedded in the base portions 63 of the shift forks 60, 61 and 62 are engaged in the cam grooves $54_1$, $54_2$ and $54_3$, respectively. The leading portions 9 of the shift forks 60, 61 and 62 are engaged with the three sleeves 8 for actuating the three roller synchro mechanisms R, respectively (see FIG. 2).

Figure 8:
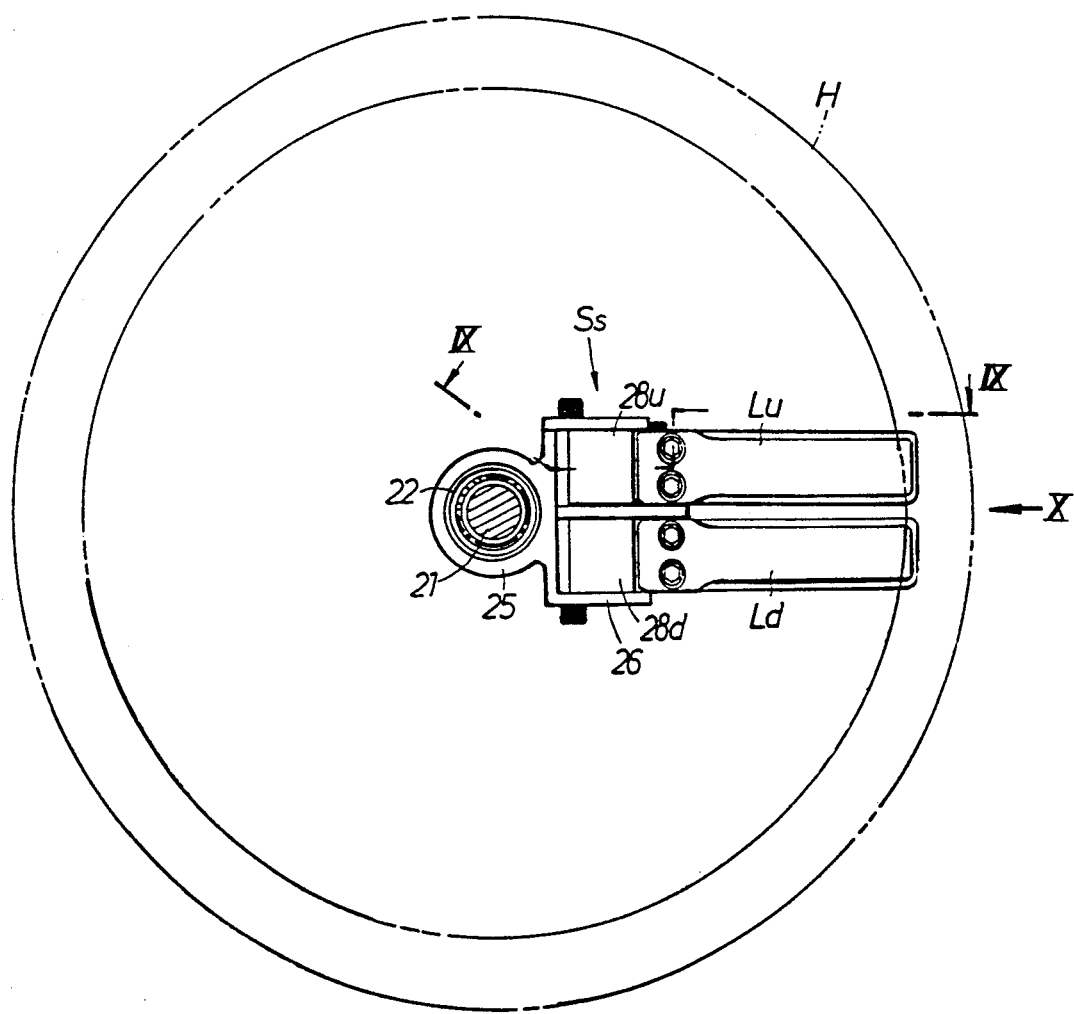
Figure 9:
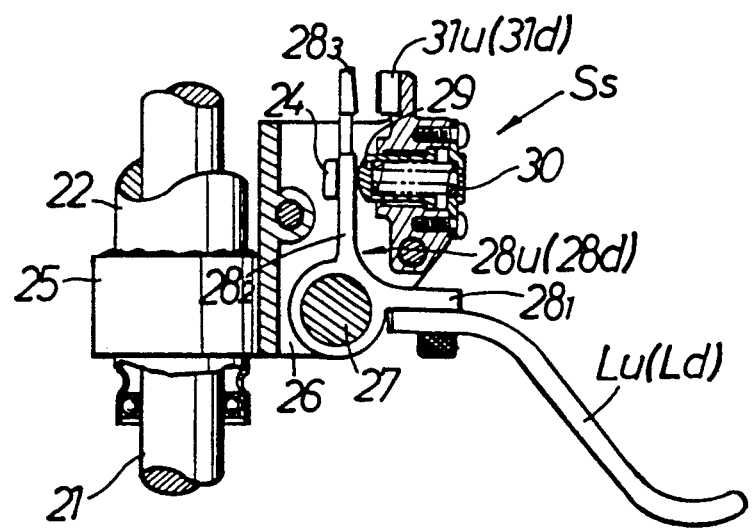
Figure 10:
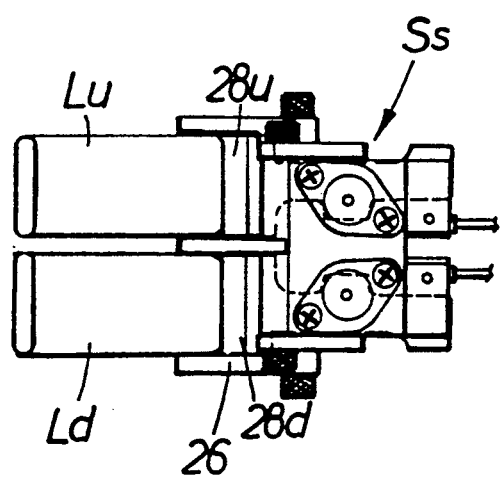

The structure of the steering wheel located shift mechanism Ss will now be described in connection with FIGS. 8 to 10.

A steering shaft 21 having the steering wheel H secured thereto is positioned into a tubular steering column 22 fixed to the vehicle body and is rotatably supported therein. A switch housing 26 is attached to a bracket 25 secured to the steering column 22, and the shift-up lever Lu and the shift-down lever Ld are secured respectively to lever-mounting portions $28_1$ of a pair of left and right L-shaped shift switch arms $28u$ and $28d$ which are pivotally supported on the switch housing 26 by a common pin 27. As can be seen from FIG. 8, the shift-up lever Lu and the shift-down lever Ld are disposed on the right side of the steering wheel H, so that if driver's hands are put on the steering wheel H, these levers can be operated by driver's right-hand fingers.

A pair of arm holders 29 are slidably supported in the switch housing 26 to abut against outer surfaces of body portions $28_2$ of the shift switch arms $28u$ and $28d$, respectively, and each of the shift switch arms $28u$ and $28d$ is biased, by a spring 30 provided in a compressed manner within the arm holder 29, inwardly, i.e., toward its shown neutral position in which the body portion $28_2$ abuts against a stopper 24 provided in the switch housing 26. A pair of shift switches $31u$ and $31d$ comprising proximity switches are disposed outside detecting portions $28_3$ provided on leading ends of the shift switch arms $28u$ and $28d$, respectively, so that when the shift-up lever Lu is pulled to move the detecting portion $28_3$ of the shift switch arm $28u$ rightwardly, the shift switch $31u$ is operated to produce a shifting-up instruction signal and when the shift-down lever Ld is pulled to move the detecting portion $28_3$ of the shift switch arm $28d$ rightwardly, the shift switch $31d$ is operated to produce a shifting-down instruction signal.

Description will now be made of the operation of the first embodiment of the present invention having the above-described construction.

In a normal operational condition, a speed-increasing or reducing instruction provided by a driver is transmitted from the accelerator pedal sensor $S_4$ for detecting the position of the accelerator pedal $P_A$ through the electronic control unit U to the throttle actuator $A_1$ for the throttle valve T, thereby controlling the opening and closing of the throttle valve T to increase or reduce the rotational speed of the engine E.

If the driver operates the shift-up lever Lu, the shifting-up instruction signal is applied to the electronic control unit U, thereby driving the throttle actuator $A_1$ and the shift actuator $A_2$. At this time, a signal from the u accelerator pedal sensor $S_4$ is temporarily intercepted, and detection signals from the engine rotational speed sensor $S_5$, the input shaft rotational speed sensor $S_6$ and the vehicle speed sensor $S_7$ are applied to the electronic control unit U, thereby driving the throttle actuator $A_1$ to reduce the rotational speed of the engine, so that the rotational speed of the input shaft $S_M$ is synchronized with a predetermined rotational speed which is determined by the output shaft Sc connected to the driving wheels to rotate the wheels at a given speed and by a reduction ratio of a gear shift stage to be established by the shifting-up.

When the input shaft $S_M$ is synchronized with the output shaft Sc in the above manner by variation in rotational speed of the engine E as a result of controlling the throttle valve T, the shift actuator $A_2$ is driven to provide a shifting-up operation. More specifically, when the pulse motor 56 is driven to rotate the shift drum 54 through a predetermined angle in FIG. 6, causing the given shift fork 60, 61, 62 to be driven axially through the pin 64 engaged in the cam groove $54_1$, $54_2$, $54_3$ provided in the outer periphery of the shift drum 54, the sleeve 8 engaging the leading end 9 of the shift fork 60, 61, 62 is driven to operate the given roller synchro mechanism R, thus establishing an intended gear shift stage. When the shifting-up is completed in this manner, the opening degree of the throttle valve T is controlled again by an output signal from the accelerator pedal sensor $S_4$.

On the other hand, if the shifting-down instruction signal is produced by operation of the shift-down lever Ld, the throttle actuator $A_1$ is driven, so that the rotational speed of the input shaft $S_M$ is synchronized with the rotational speed of the output shaft Sc in the same manner as described above whereby the shift actuator $A_2$ is driven, thus establishing a desired gear shift stage.

It should be noted that the clutch C is used only at the start, and if the clutch pedal Pc is released after the engagement of the clutch C has been once released by depressing the clutch pedal Pc, the opening and closing of the solenoid valve V of the clutch damper D is controlled while detecting the engagement by the clutch stroke sensor $S_2$, thereby ensuring that the clutch C is smoothly brought into engagement.

The operation of the roller synchro mechanism R now will be described. In a condition in which the sleeve 8 is in its neutral position shown in FIG. 2, with the dowel 8a thereof fitted in the dowel-admission groove $13a_2$ in the retainer 13a on the side of the gear 3a, the inner cam 10a and the retainer 13a are positioned in their states shown in FIG. 3 through the spline 11a, the rotary shaft 1, the spline 5, the boss 6, the spline 7, the dowel 8a of the sleeve 8 and the dowel-admission groove $13a_2$. Under this condition, the rollers 12a in the retainer 13a are slightly moved radially inwardly within the roller-supporting holes $13a_1$ away from the roller abutment surface $3a_2$ of the gear 3a. In this stage, the outer peripheral surface of the retainer 13a and the roller abutment surface $3a_2$ of the gear 3a are slipping relative to each other, so that the transmission of torque between the rotary shaft and the gear 3a is interrupted. During this time, the dowel 8b of the sleeve 8 is also fitted in the dowel-admission groove $13b_2$ of the retainer 13b, so that the transmission of torque between the rotary shaft 1 and the gear 3b is also interrupted.

If the sleeve 8 is moved from this state in a direction of the arrow A in FIG. 2 by the shift actuator $A_2$, thereby removing the dowel 8a from the dowel-admission groove $13a_2$, the retainer 13a and the inner cam 10a can be freely rotated slightly by torque applied from the rotary shaft 1 or the gear 3a, so that the rollers 12a are strongly urged radially outwardly within the roller-supporting holes $13a_1$ by the cam grooves $10a_1$ in the inner cam 10a to bear against the roller abutment surface $3a_2$. This causes the inner cam 10a and the gear 3a, and thus the rotary shaft 1 and the gear 3a, to be brought into integral engagement with each other, thereby establishing the n-th gear shift stage. Conversely, if the sleeve 8 is moved in a direction of the arrow B in FIG. 2, the rotary shaft 1 and the gear 3b are brought into integral engagement with each other by an action similar to that described above, thereby establishing the n+1-th gear shift stage.

Thus, the roller synchro mechanism R is employed in the transmission M and operated by the shift actuator $A_2$ driven as a result of operation of the shift-up lever Lu of the shift-down lever Ld and therefore, it is possible to complete the gear-shifting operation quickly in a shorter time. Moreover, since the synchronization is conducted by controlling the throttle valve T to change the rotational speed of the engine E in gear-shifting, the gear-shifting shock can be reduced, and it is unnecessary to operate the clutch C every time, which enables a further shortening of the gear shifting time.

In addition, in order to operate the roller synchro mechanism R, it is only required for the sleeve 8 to be slided axially overcoming a low frictional force and therefore, it is possible to employ a drum-type shift actuator $A_2$ that provides a smaller driving force but having a simplified structure, resulting in reduction in size and weight of the entire transmission.

Further, in operating the steering wheel located shift mechanism Ss, it is possible for the driver to produce the shifting-up or shifting-down instruction signal only by his right hand, leading to an improvement in operability.

Figure 11:
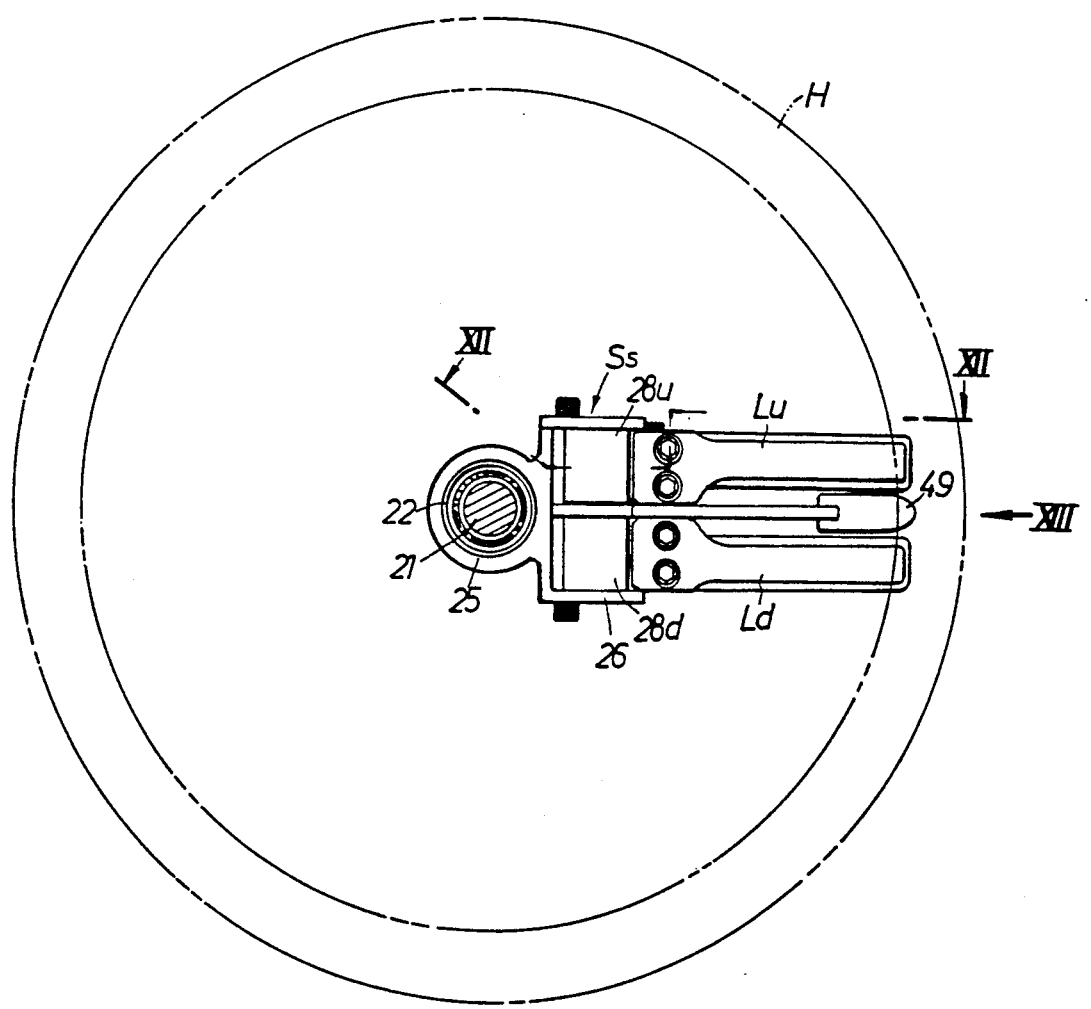
FIGS. 11 to 13 are views similar to FIGS. 8 to 10, respectively but illustrating a modification of the first embodiment.
Figure 12:
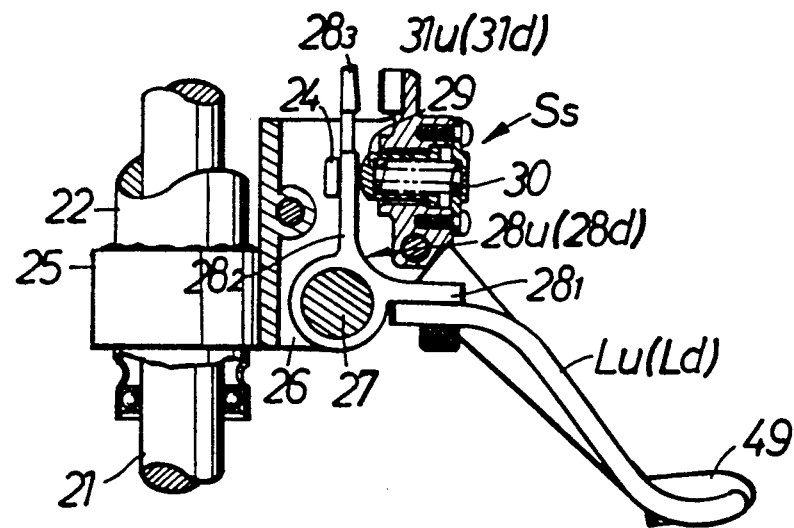
Figure 13:
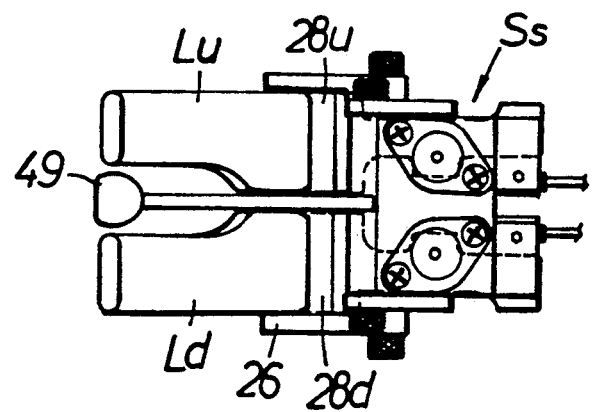

FIGS. 11 to 13 illustrate a modification to the first embodiment. A steering wheel located shift mechanism Ss in this modification has a feature in that the shift-up lever Lu and the shift-down lever Ld are partitioned by a sector guide 49 provided on the steering column 22. The provision of the sector guide 49 avoids a disadvantage that in operating the shift-up lever Lu or the shift-down lever Ld by the driver's right-hand fingers, both of the levers Lu and Ld may be inadvertently operated simultaneously.

Figure 14:
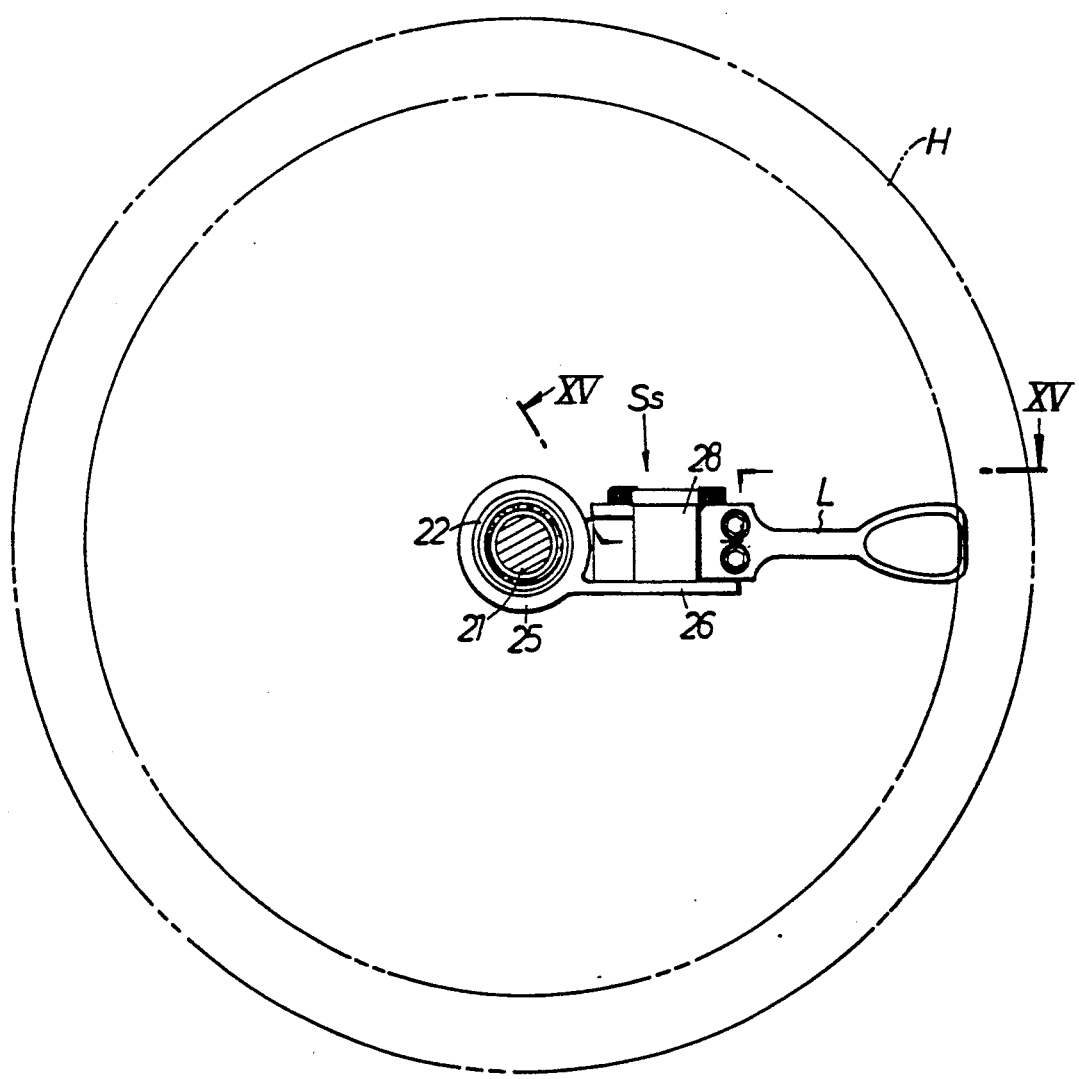
FIGS. 14 and 15 illustrate a second embodiment of the present invention, FIG. 14 being a front view of the steering wheel located shift mechanism, and FIG. 15 being a sectional view taken along a line XV—XV in FIG. 14.
Figure 15:
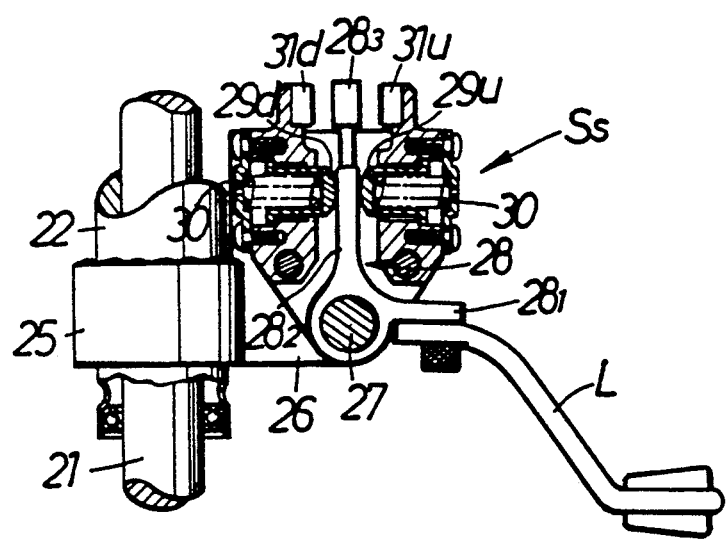

FIGS. 14 and 15 illustrate a second embodiment of the present invention. In this second embodiment, the steering wheel located shift mechanism Ss comprises a single shift lever L extending to the right side within the steering wheel H and is designed so that if the driver pulls the shift lever L toward himself, the shift switch 31u for producing the shifting-up instruction signal is operated, while if the driver pushes the shift lever L away from himself, the shift switch 31d for producing the shifting-down instruction signal is operated. Thus, even with this embodiment, it is possible for the driver to conduct both the shifting-up and the shifting-down operations by one hand and moreover, the employment of the single shift lever eliminates the possibility that both of the shifting-up and shifting-down instruction signals may be simultaneously produced.

Figure 16:
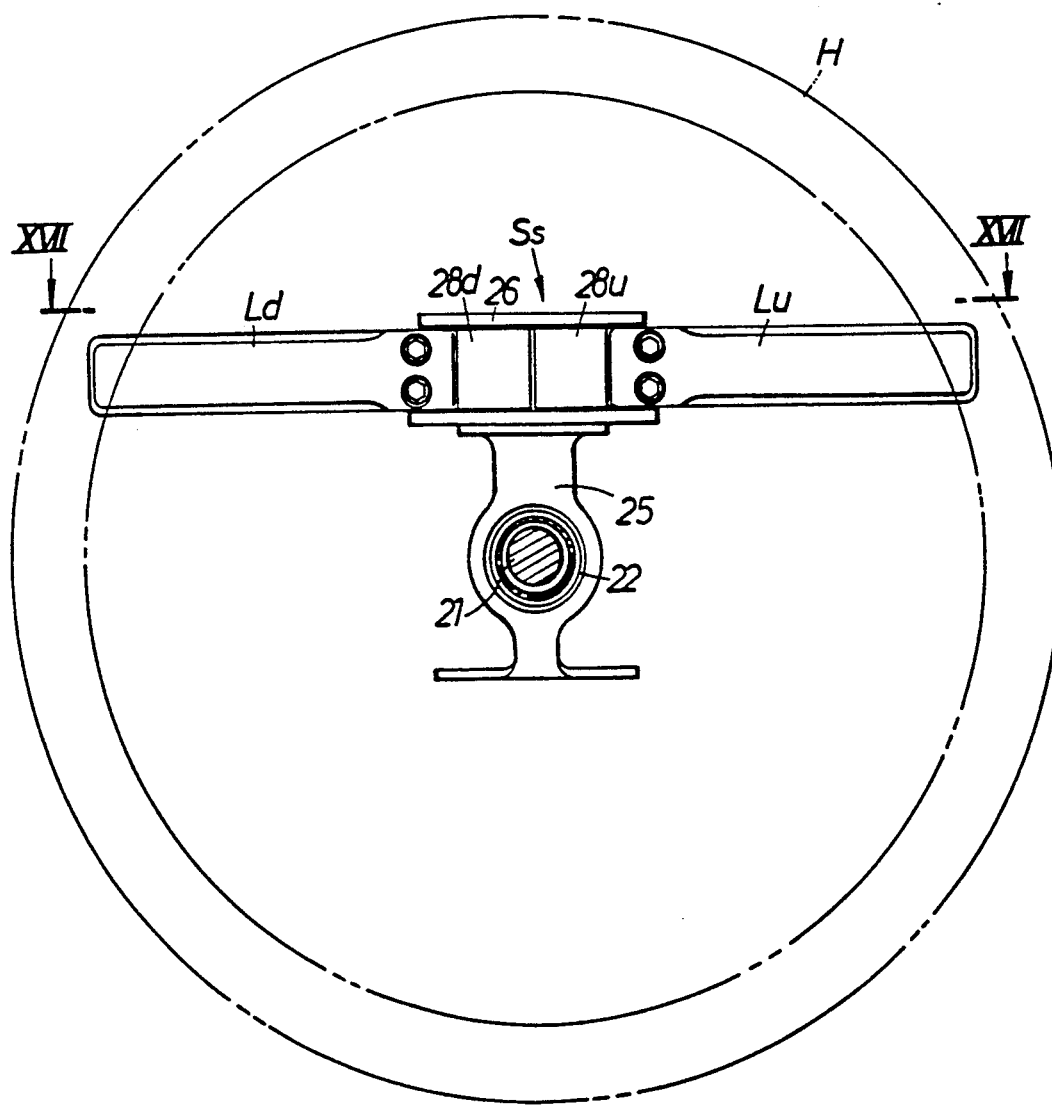
Figure 17:
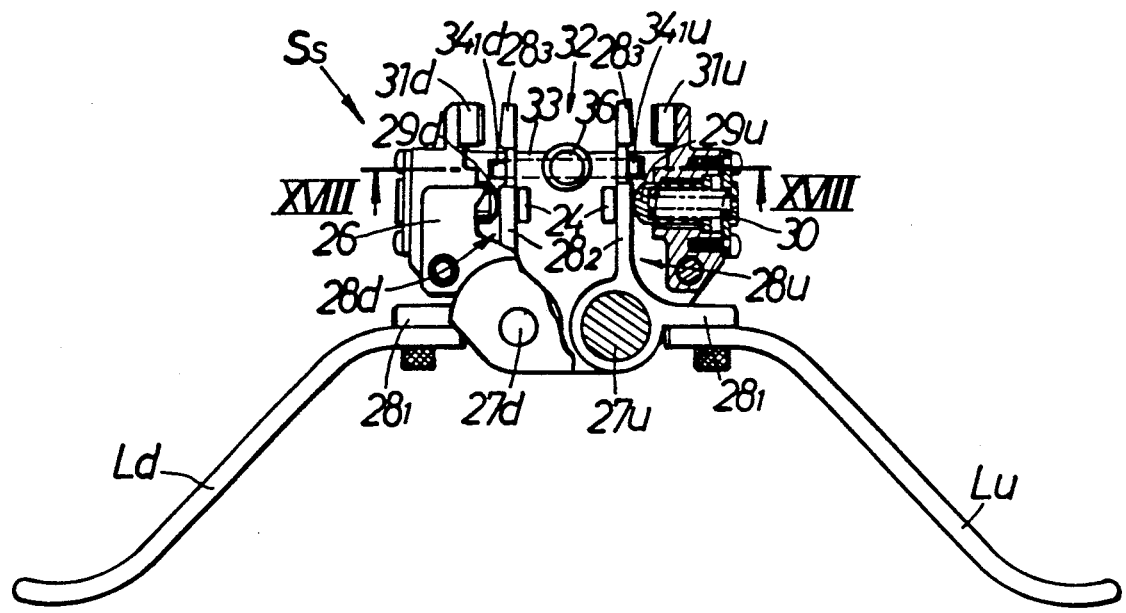
Figure 18:
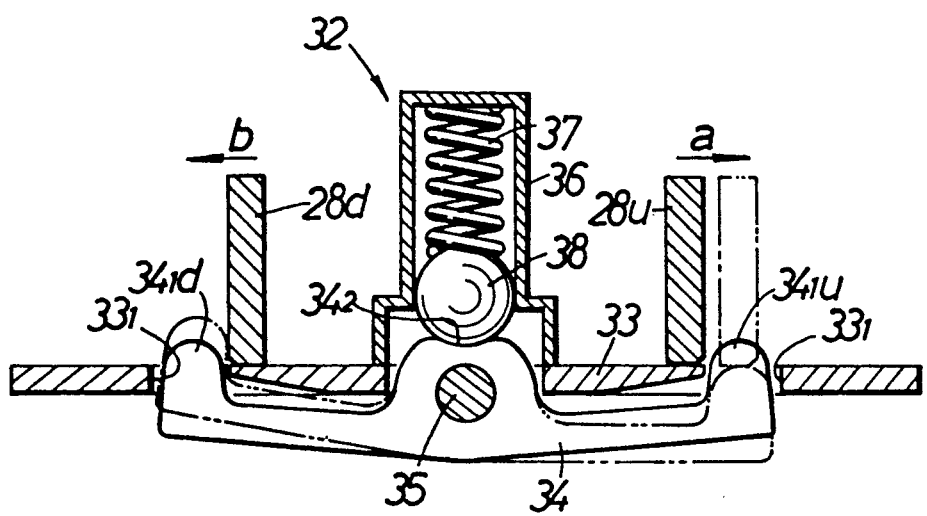

FIGS. 16 to 18 illustrate a third embodiment of the present invention. A shift-up lever Lu and a shift-down lever Ld of the steering wheel located shift mechanism Ss in this embodiment extend on both the left and the right sides within the steering wheel H at locations closer to the top thereof, so that when the driver puts his both hands on the steering wheel H, he can operate the shift-up lever Lu and the shift-down lever Ld by his right and left hands, respectively.

In this embodiment, a pair of arm holders 29u and 29d are slidably supported in the switch housing 26 to abut against outer surfaces of body portions $28_2$ of the shift switch arms 28u and 28d, respectively, and each of the shift switch arms is biased, by a spring 30 provided in a compressed manner in each of the arm holes 29u and 29d, inwardly, i.e., toward its shown neutral position in which the body portion $28_2$ abuts against a stopper 24 provided in the switch housing 26. A pair of left and right shift switches 31u and 31d comprising proximity switches are disposed on opposite left and right sides of detecting portions $28_3$ provided at leading ends of the shift switch arms 28u and 28d, respectively. Thus, if the shift-up lever Lu is pulled to move the detecting portion $28_3$ of the shift switch arm 28u rightwardly, the shift switch 31u is operated to produce a shifting-up instruction signal, while if the shift-down lever Ld is pulled to move the detecting portion $28_3$ of the shift switch arm 28d leftwardly, the shift switch 31d is operated to produce a shifting-down instruction signal.

An interlock mechanism 32 provided on the switch housing 26 comprises a guide plate 33 with which lower surfaces of the body portions $28_2$ of the shift switch arms 28u and 28d are placed into sliding contact, and an interlock lever 34 is swingably supported on a back of the guide plate 33 by a pin 35. The interlock lever 34 has locking portions $34_1u$ and $34_1d$ formed at opposite ends thereof to slightly project through two holes $33_1$ made in the guide plate 33 up to the side of a front surface of the guide plate 33. A ball 38 is fitted in a recess $34_2$ provided at a central portion of the interlock lever 34, and is held in a cylindrical guide 36 and biased by a spring 37, thereby retaining the interlock lever 34 at a neutral position shown by the solid line in FIG. 18.

With this embodiment, if operation of, for example, the shift-up lever Lu causes one of the shift switch arms 28u to be moved in a direction of an arrow "a" from a position shown by the solid line in FIG. 18 to a position shown by the dashed line in FIG. 18, the interlock lever 34 having the locking portion $34_1u$ urged by the shift switch arm 28u is moved to a position shown by the dashed line, so that the other locking portion $34_1d$ projects out of the hole 33 in the guide plate 33. This ensures that even if the shift-down lever Ld is intended to be simultaneously operated, the other switch arm 28d is brought into engagement with the locking portion 34d which is in projection, and thus the movement of the other shift switch arm 28d in a direction of the arrow "b" is inhibited. Consequently, the two shift switches 31u and 31d are prevented from being simultaneously operated. If the shift-up lever Lu now operated is then returned to its neutral position, thereby causing the shift switch arm 28u to be returned to the position shown by the solid line, the interlock lever 34 is returned to its neutral position by an urging force of the ball 38 biased by the spring 37, resulting in a condition in which either the shift-up lever Lu or the shift-down lever Ld is operable.

Figure 19:
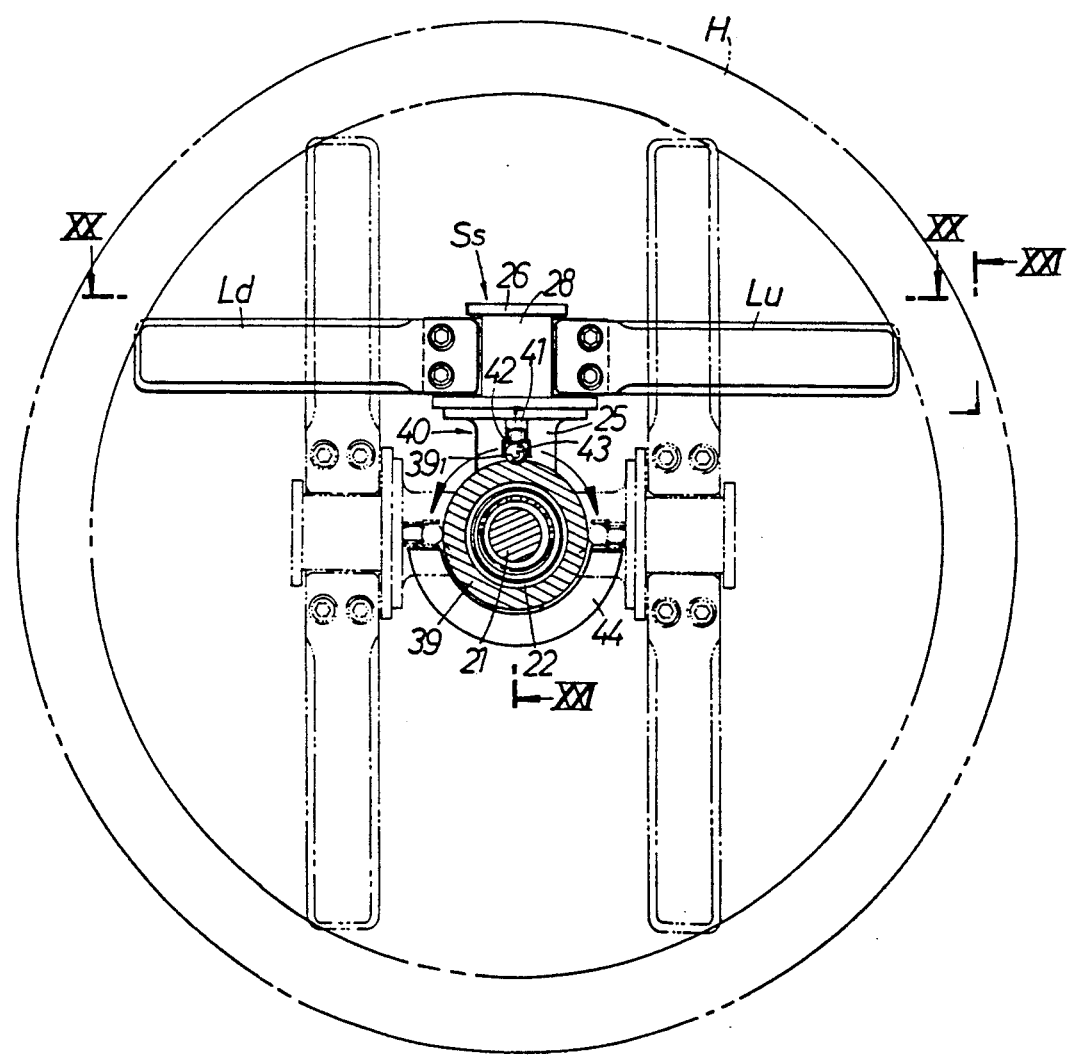
Figure 20:
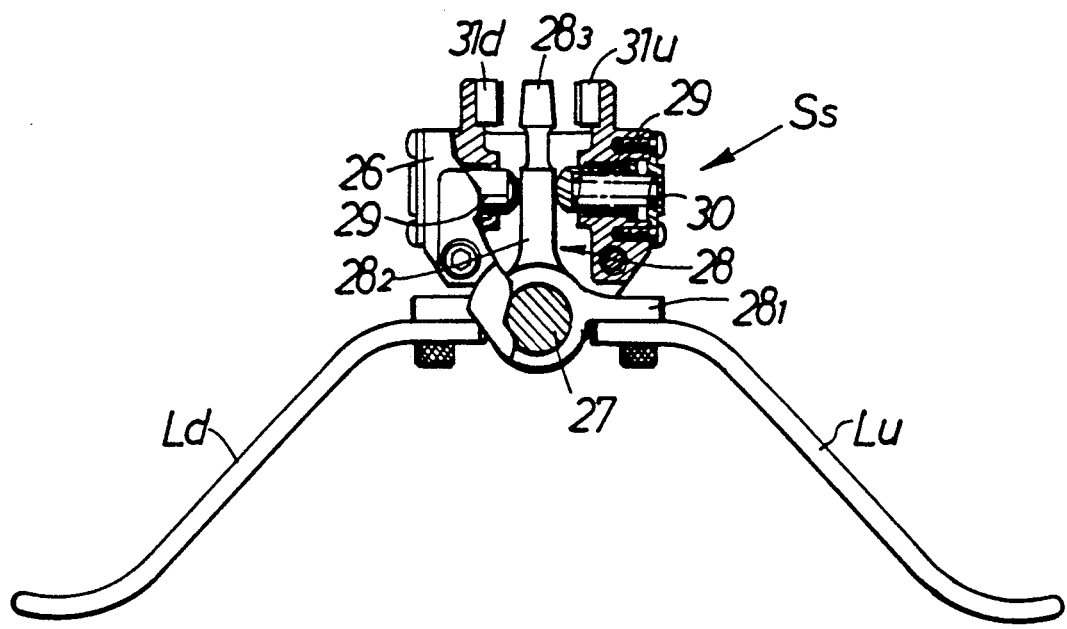
Figure 21:
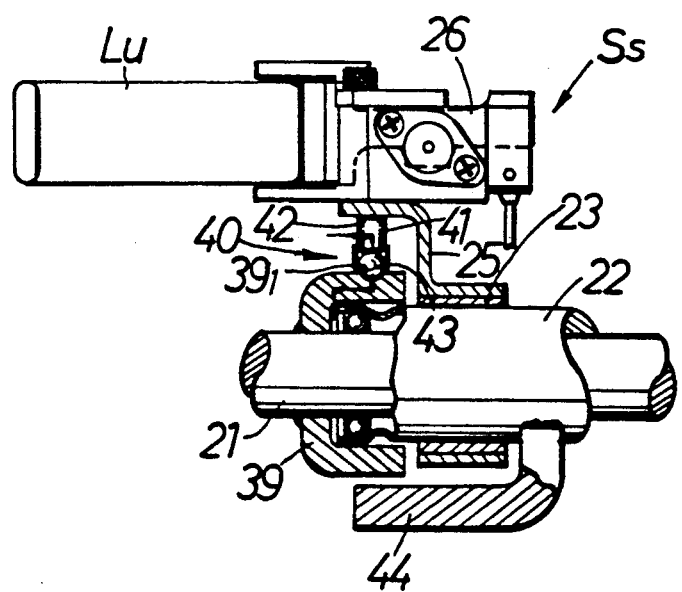

FIGS. 19 to 21 illustrate a fourth embodiment of the present invention, wherein a switch housing 26 is secured to a bracket 25 which is rotatably supported on an outer periphery of the steering column 22 through a bush 23. A right shift-up lever Lu and a left shift-down lever Ld are secured to a lever mounting portion $28_1$ of a T-shaped shift switch arm 28 which is swingably supported in the switch housing 26 by a pin 27.

A pair of arm holders 29 are slidably supported in the switch housing 26 to abut against a body portion $28_2$ of the shift switch arm 28 from left and right sides, and the shift switch arm 28 is biased inwardly, i.e., in a direction in which it is held at its shown neutral position, by springs 30 provided in a compressed manner within the arm holders 29. A pair of shift switches 31u and 31d comprising proximity switches are disposed on opposite left and right sides of a detecting portion $28_3$ provided at a leading end of the shift switch arm 28. Thus, if the shift-up lever Lu is pulled to move the detecting portion $28_3$ provided at a leading end of the switch arm 28. Rightwardly in FIG. 20, the shift switch 31u is operated to produce a shifting-up instruction signal, while if the shift-down lever Ld is pulled to move the detecting portion of the shift switch arm 28 leftwardly, the shift switch 31d is operated to produce a shifting-down instruction signal.

An operatively connecting mechanism 40 comprising a detent mechanism is provided between a cup-like boss 39 secured to the steering shaft 21 and the bracket 25 supporting the switch housing 26. The operatively connecting mechanism 40 includes a ball 43 biased in a projecting direction by a spring 42 which is provided in a compressed manner within a cylindrical retaining member 41 secured to the bracket 25. The ball 43 engages a recess $39_1$ made in the outer periphery of the boss 39. A semicircular stopper 44 is secured to a lower portion of the steering column 22, so that if the steering wheel H is rotated leftwardly or rightwardly through 90° or more, the cylindrical retaining member 42 of the operatively connecting mechanism 40 abuts against the stopper 44.

With this embodiment, if the driver rotates the steering wheel H, the rotation of the steering shaft 2 in unison with the steering wheel H is transmitted via the operatively connecting mechanism 40 to the bracket 25 rotatably supported on the steering column 22, causing the switch housing 26 attached to the bracket 25 to be rotated together with the shift levers Lu and Ld. Therefore, the shift levers Lu and Ld are rotated together interlockingly with the rotation of the steering wheel H. Thus, with both driver's hands remaining in the same position on the steering wheel H, it is possible to produce the shifting-up and shifting-down instruction signals. If the steering wheel H is rotated through an angle exceeding 90° until the cylindrical retaining member 41 of the operatively connecting mechanism 40 abuts against the stopper 44, the rotation of the bracket 25 is inhibited and hence, the ball 43 is removed from the recess $39_1$ in the boss 39, so that only the steering shaft 21 is rotated through an angle exceeding 90°. this causes the shift-up lever Lu and the shift-down lever Ld to be restrained to their positions shown by dashed lines in FIG. 19 and prevented from being further rotated. This ensures that even if the angle of rotation of the steering wheel H exceeds 90°, the rotational relationship between the shift-up and shift-down levers Lu and Ld is prevented from being reversed, i.e. from right to left and left to right, respectively. If the steering wheel H is returned to a rotational angle less than 90°, the bass 43 of the operatively connecting mechanism 40 is fitted again into the recess $39_1$ in the boss 39, causing the shift-up and shift-down levers Lu and Ld to be returned to their positions shown by the solid lines in FIG. 19 to turn in unison.

Figure 22:
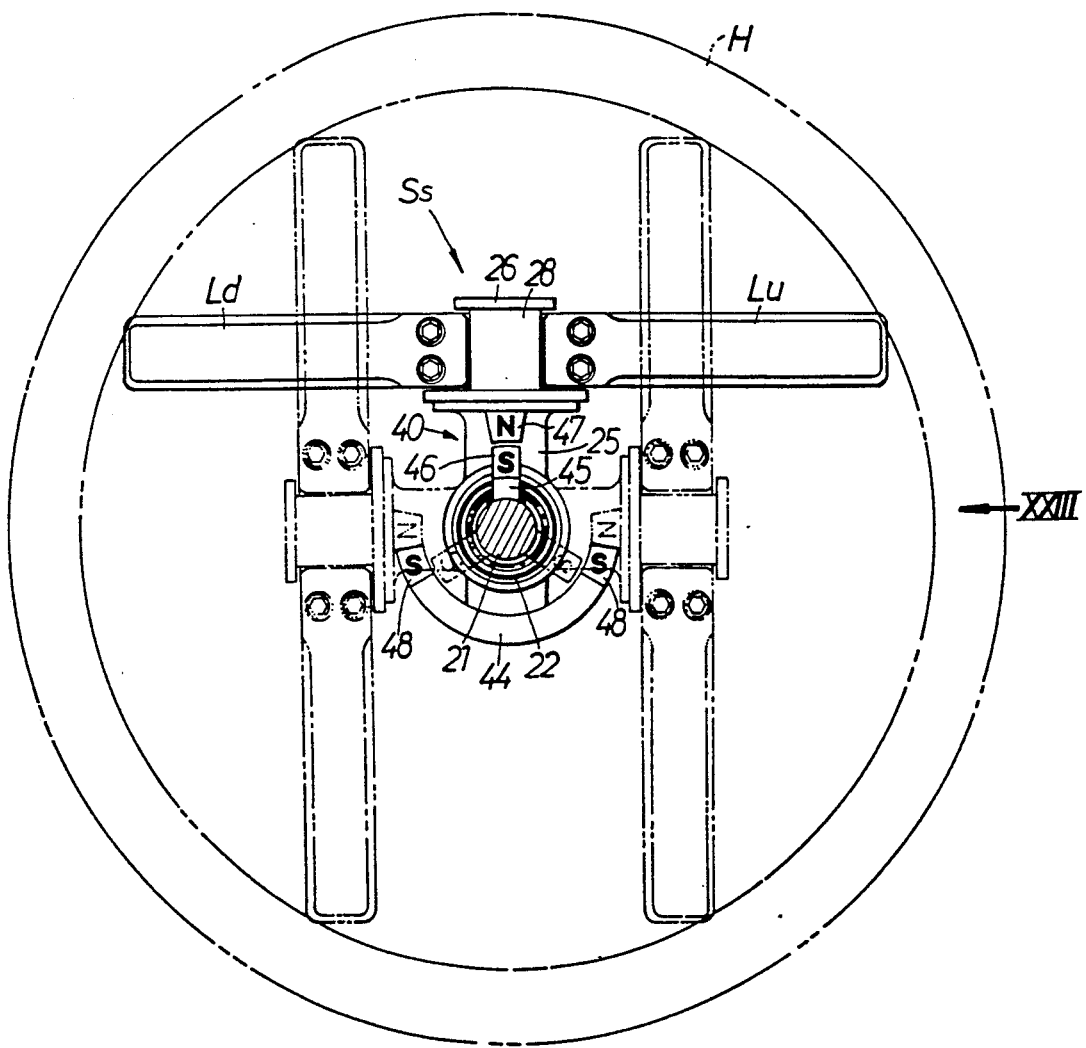
Figure 23:
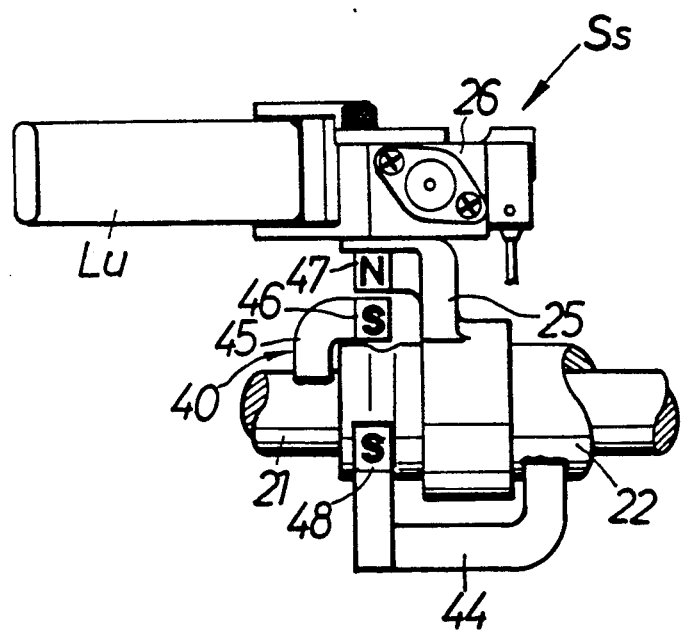

FIGS. 22 and 23 illustrate a fifth embodiment of the present invention, which has a feature that a magnet is utilized in an operatively connecting mechanism 40 of a steering shift mechanism Ss. In other respects, the fifth embodiment has the same structure as in the previous embodiments. More specifically, the operatively connecting mechanism 40 has a structure in which an S pole of a driving magnet 46 mounted at a leading end of a magnet-supporting member 45 secured to a steering shaft 21 is disposed in an opposed relation to an N pole of a driven magnet 47 mounted on a bracket 25 rotatably supported on a steering column 22, and a S pole of a stopper magnet 48 is disposed on a stopper 44 secured to the steering column 22, so as to abut against the driven magnet 47 to attract it. The stopper magnet 48 has a magnetic force set slightly smaller than that of the driving magnet 46.

With this embodiment, if the steering wheel H is operated to rotate the steering shaft 21, the driven magnet 47 is attracted to the driving magnet 46 and moved in a manner to follow the driving magnet 46, whereby the bracket 25 supporting the driven magnet 47 is rotated in unison with the steering shift mechanism Ss. If the steering wheel H is rotated through an angle exceeding 90° until the driven magnet 47 abuts against the stopper magnet 48, the rotation of the bracket 25 is inhibited, and the driving magnet 46 is rotated away from the driven magnet 47 to a position shown by a dashed line in FIG. 22, but the shift-up and shift-down levers Lu and Ld are restrained to their positions shown by dashed lines and thus prevented from being further rotated. If the rotational angle of the steering wheel H becomes smaller than 90° in the course of returning the steering wheel H to its neutral position, the driven magnet 47 that has been attracted to the stopper magnet 48 is attracted to the driving magnet 46 having a larger magnetic force and thus returned to its neutral position.

Even with this embodiment, if the angle of rotation of the steering wheel H is less than 90°, the shift-up and shift-down levers Lu and Ld are rotated in a manner to follow the steering wheel H, but if the angle exceeds 90°, the rotation of the shift-up and shift-down levers Lu and Ld is restrained, and only the steering wheel H is rotated.

While the embodiments of the present invention have been described in detail, it will be understood that various minor modifications in design can be made without departing from the scope of the invention defined in claims. For example, the shift levers Lu and Ld have been provided on the right side within the steering wheel H in the first and second embodiments, but they may be provided on the left side. The shift switch 31u, 31d need not necessarily be a proximity switch and may be any other switch such as a limit switch.

What is claimed is:

1. An electronically controlled transmission comprising
    a roller synchro mechanism adapted to establish a desired gear-shift stage by bringing a gear relatively rotatably carried on a rotary shaft into engagement with said rotary shaft through rollers;
    a shift actuator for driving a sleeve which operates said roller synchro mechanism;
    a throttle actuator adapted to control the rotational speed of an engine; and
    an electronic control unit for controlling said shift actuator and said throttle actuator on the basis of a shifting instruction signal, wherein
    said shift actuator comprises a shift drum having a cam groove on an outer periphery thereof and is connected to and rotatably driven by a motor through spur gear means, and a shift fork axially slidably carried on said shift drum, said shift fork having one end engaging with the sleeve and another end formed into a base portion surrounding the shift drum, said base portion being provided with a pin engaging with said cam groove.

2. An electronically controlled transmission according to claim 1, wherein said roller synchro mechanism comprises an annular retainer disposed between the rotary shaft and the gear for relative rotation with respect to the rotary shaft and gear, and a plurality of rollers radially movably supported in the retainer and opposed to a roller abutment surface formed on one of either the rotary shaft or the gear and to cam grooves formed on the other of the rotary shaft and the gear, and wherein a dowel of the sleeve which is relatively non-rotatably but axially movably carried in the rotary shaft or the gear to be driven by the shift actuator is brought into and out of engagement with a dowel-admission groove provided in the retainer, thereby bringing the rotary shaft and the gear into and out of mutual engagement.

3. An electronically controlled transmission according to claim 1, wherein a steering wheel located shift mechanism is provided for operating a switch with means to produce a shift-up or shift-down instruction signal to said electronic control unit.

4. An electronically controlled transmission providing clutchless shifting, comprising:
    a roller synchro mechanism adapted to establish a desired gear-shift stage by bringing a gear relatively rotatably carried on a rotary shaft into engagement with said rotary shaft through rollers;
    a shift actuator for driving a sleeve which operates said roller synchro mechanism;
    a throttle actuator adapted to control the rotational speed of the engine; and
    an electronic control unit for controlling said shift actuator and said throttle actuator on the basis of a shifting instruction signal, wherein
    said shift actuator comprises a shift drum having a cam groove on an outer periphery thereof and is connected to and rotatably driven by a motor through spur gear means and a shift fork axially slidably carried on said shift drum, said spur gear means comprises a drive gear having a smaller diameter than any other gear comprising said spur gear means, and said shift fork has one end engaging with the sleeve and another end formed into a base portion surrounding the shift drum, said base portion being provided with a pin engaging with said cam groove.

* * * * *